Feb. 13, 1923.
T. L. WOOD
1,444,895
MUDHOOK FOR MOTOR VEHICLE WHEELS
Filed July 3, 1922
2 sheets-sheet 1
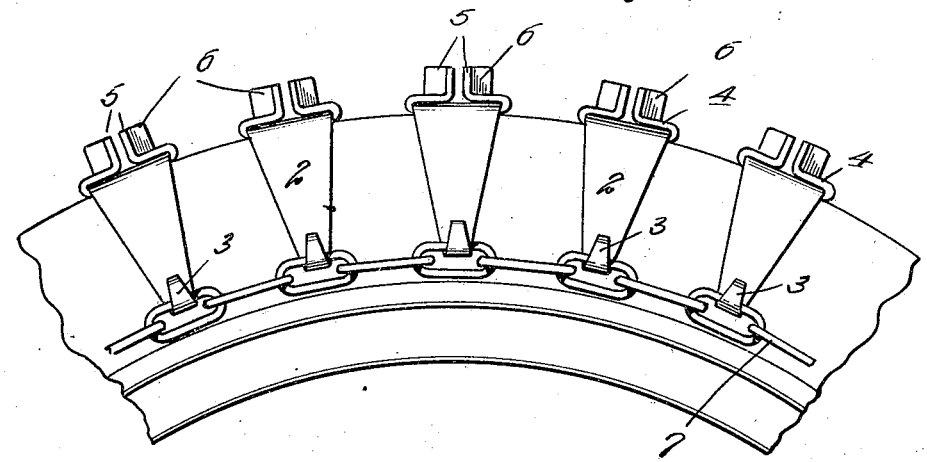
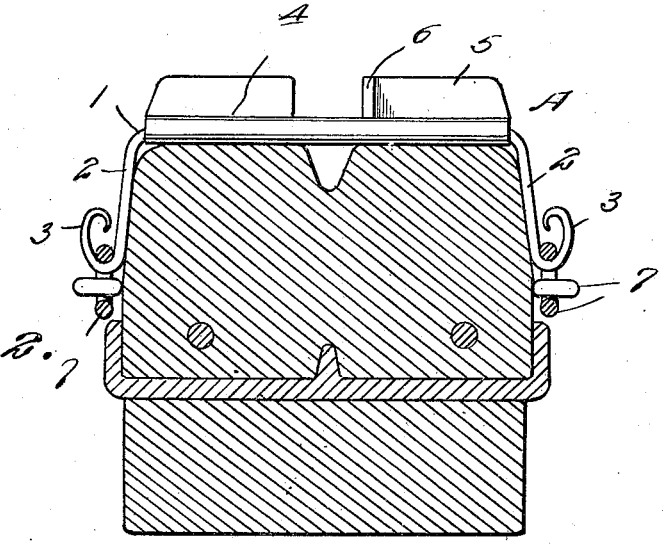
Witnesses:
F. L. Fox,
N. Berman
Inventor
T. L. Wood,
By Clarence A. O'Brien
Attorney

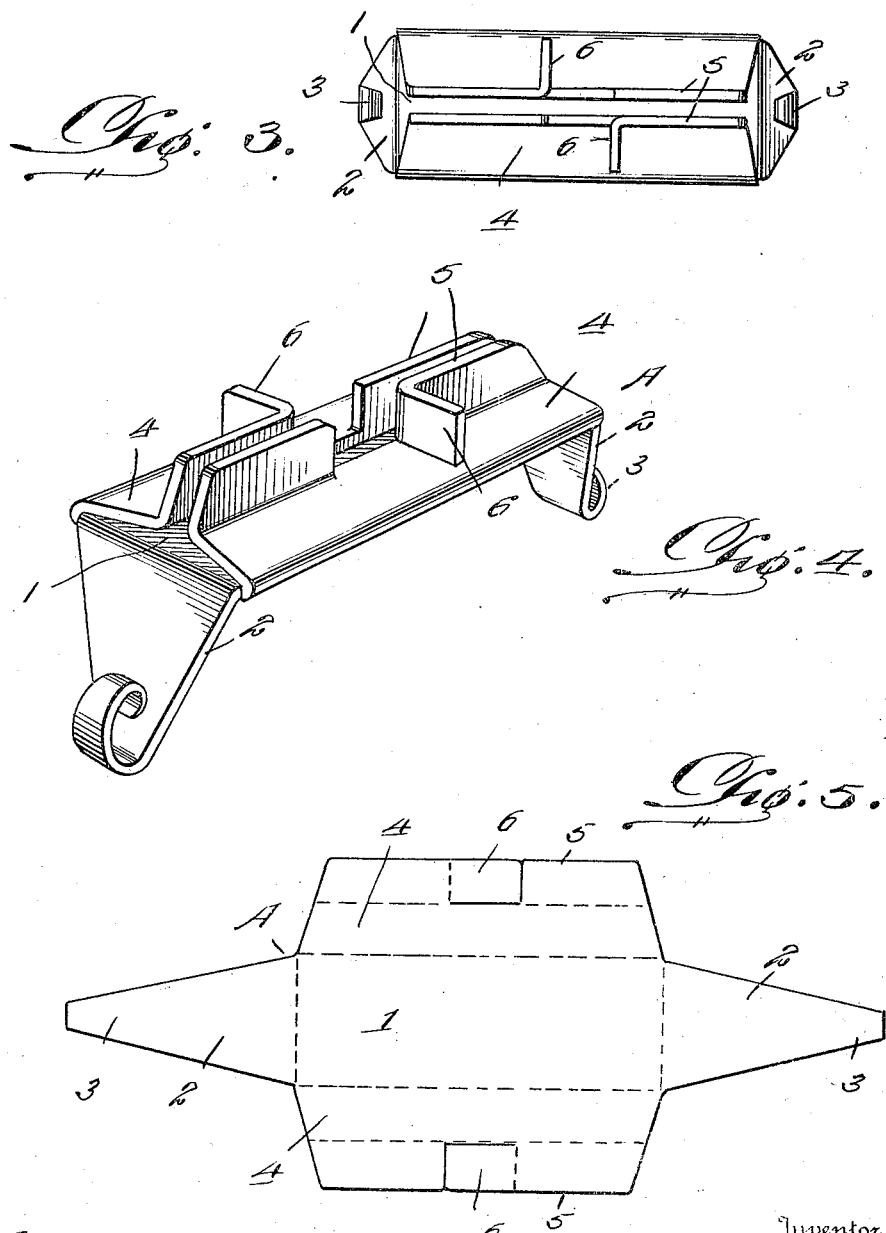

Patented Feb. 13, 1923.

1,444,895

UNITED STATES PATENT OFFICE.

THERON L. WOOD, OF HUDDLESTON, VIRGINIA.

MUDHOOK FOR MOTOR-VEHICLE WHEELS.

Application filed July 3, 1922. Serial No. 572,596.

*To all whom it may concern:*

Be it known that I, THERON L. WOOD, a citizen of the United States, residing at Huddleston, in the county of Bedford and State of Virginia, have invented new and useful Improvements in Mudhooks for Motor-Vehicle Wheels, of which the following is a specification.

In carrying out the present invention it is my purpose to provide a mud hook which may be readily and quickly fastened to the wheel of a motor vehicle, so as to increase the traction of the wheel and at the same time eliminate skidding.

It is also my purpose to improve and simplify the general construction of mud hooks and to provide a mud hook which will embrace the desired features of efficiency, simplicity and durability and which may be manufactured and marketed at small cost.

With the above recited objects in view, and others of a like nature, the invention resides in the construction, combination and arrangement of parts set forth in and falling within the scope of the appended claims.

In the accompanying drawings:

Figure 1 is a fragmentary side elevation of a wheel equipped with a series of mud hooks constructed in accordance with my invention.

Figure 2 is a cross sectional view through the same.

Figure 3 is a top plan view of one of the hooks.

Figure 4 is a perspective view of the same.

Figure 5 is a plan view of the blank from which the hook is stamped.

Referring now to the drawings in detail, and particularly to Figures 3, 4 and 5, A designates my improved mud hook as an entirety. This improved hook is made from a blank of metal stamped out to form a body portion 1 of a length corresponding to the transverse dimension of the motor vehicle tire and of a width less than the length thereof. The ends of this body portion are turned down to form arms 2 and the lower ends of the arms are turned up to form yieldable hooks 3. At the side edges of the body 1 the blank is bent upon itself to provide inwardly extending plates 4—4 that overlie the body 1 and have their inner ends spaced apart a short distance and confronting each other. Integral with the inner end edges of the plates 4—4 are upwardly extending traction flanges 5—5, respectively. These flanges 5—5 at the centers thereof are stamped outwardly to form laterally extending anti-skid flanges 6—6, respectively. The flanges 6—6 extend in relatively opposite directions and are arranged at right angles to the traction flanges 5, as clearly shown in Figures 3 and 4 of the drawings.

In practice, the mud hooks are placed about the tire, as shown in Figures 1 and 2 of the drawings, and the hooks are spaced apart suitable distances. The hooks 3 upon each side of the wheel or tire are connected together by means of chains 7, the hooks 3 engaging in the links of the chains and the chains 7 acting to hold the mud hooks securely upon the tire on the wheel. When each mud hook is thus positioned upon the tire the body portion 1 lies in contact with the outer side of the tire, while the depending arms 2 embrace the side walls of the tire, as clearly shown in Figure 2 of the drawings, and the chains hold the mud hooks securely to the tire, so that in the turning of the wheel the traction thereof will be increased by means of the traction flanges 5, while lateral skidding will be prevented by the anti-skid flanges 6. The hooks 3 are so formed that the links of the chains may be snapped into and out of such hooks, so that in the event of one of the mud hooks becoming broken or mutilated such mutilated hook may be removed and a new one substituted therefor.

I have entered into a detail description of the construction and relative arrangement of parts embraced in the present and preferred embodiment of my invention with a view to imparting a full, clear and exact understanding of the said embodiment. I do not desire, however, to be understood as confining myself to the said specific construction and relative arrangement of parts, inasmuch as in the future practice of my invention such changes or modifications may be made as fairly fall within the scope of my invention as defined by my appended claims.

Having thus described the invention, what is claimed as new, is:—

1. A mud hook stamped from a single sheet of metal formed to provide a body portion, plates integral with the edges of said body portion and overlying the body portion and having their confronting edges spaced apart, and traction flanges integral with the edges of said plates, respectively, and projecting outwardly therefrom.

2. A mud hook stamped from a single sheet of metal formed to provide a body portion, plates integral with the edges of said body portion and overlying the body portion and having their confronting edges spaced apart, traction flanges integral with the edges of said plates, respectively, and projecting outwardly therefrom, and anti-skid flanges stamped from said traction flanges, respectively, at the center thereof and extending in relatively opposite directions, said anti-skid flanges being arranged at right angles to said traction flanges.

3. A mud hook stamped from a single sheet of metal formed to provide a body portion, plates integral with the edges of said body portion and overlying the body portion and having their confronting edges spaced apart and traction flanges integral with the edges of said plates, respectively, and projecting outwardly therefrom, arms integral with the ends of said body, respectively, and having their inner ends formed to provide hooks, each hook being of a resilient nature whereby a chain may be snapped into and out of the same.

In testimony whereof I affix my signature.

THERON L. WOOD.